United States Patent
Ke et al.

(10) Patent No.: US 10,133,172 B2
(45) Date of Patent: Nov. 20, 2018

(54) LENS MODULE AND PROJECTOR USING THE SAME

(71) Applicant: Coretronic Corporation, Hsin-Chu (TW)

(72) Inventors: Chi-Wen Ke, Hsin-Chu (TW); Hung-Wei Lin, Hsin-Chu (TW); Hui-Ju Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/658,865

(22) Filed: Jul. 25, 2017

(65) Prior Publication Data

US 2018/0031960 A1   Feb. 1, 2018

(30) Foreign Application Priority Data

Jul. 28, 2016 (CN) .......................... 2016 1 0602058

(51) Int. Cl.
   *G03B 21/14* (2006.01)
   *G03B 21/53* (2006.01)
   *G01V 7/02* (2006.01)

(52) U.S. Cl.
   CPC .............. *G03B 21/53* (2013.01); *G01V 7/02* (2013.01); *G03B 21/142* (2013.01)

(58) Field of Classification Search
   CPC ......... G01V 7/02; G03B 21/142; G03B 21/53
   See application file for complete search history.

(56) References Cited

U.S. PATENT DOCUMENTS

| 8,860,866 B2 | 10/2014 | Yasuda et al. | |
| 2014/0184801 A1* | 7/2014 | Choi | H04N 7/185 |
| | | | 348/158 |
| 2016/0063919 A1* | 3/2016 | Ha | G02B 27/017 |
| | | | 345/156 |

FOREIGN PATENT DOCUMENTS

| CN | 101840144 B | 6/2012 |
| CN | 103814322 A | 5/2014 |
| TW | I447356 B | 8/2014 |

\* cited by examiner

*Primary Examiner* — Sultan Chowdhury
*Assistant Examiner* — Magda Cruz
(74) *Attorney, Agent, or Firm* — Li-Jen Shen

(57) ABSTRACT

A lens module includes a lens, a first gravity sensor and a processor. The lens includes an optical axis and an adjustment assembly. The adjustment assembly rotates around the optical axis. The first gravity sensor is disposed on the adjustment assembly. The adjustment assembly drives the first gravity sensor to rotate. The first gravity sensor is configured to perform detection at different time points. The first gravity sensor generates a first output at a first time point and a second output at a second time point. The processor calculates first and second angles of the first gravity sensor relative to a water level according to the first and second outputs respectively. The processor controls a focus adjustment of the lens according to the first angle and the second angle. A projector employing the aforementioned lens module is also provided.

15 Claims, 5 Drawing Sheets

LENS MODULE AND PROJECTOR USING THE SAME

CROSS-REFERENCE TO RELATED APPLICATION

This application claims the priority benefit of CN201610602058.2 field on 2016 Jul. 28. The entirety of the above-mentioned Patent Application is hereby incorporated by reference herein and made a part of this specification.

FIELD OF THE INVENTION

The invention relates to a lens module, and more particularly to a lens module for a projector.

BACKGROUND OF THE INVENTION

Projector is a display device for producing a large-size screen. The imaging principle of a projector is converting an illumination beam generated by a light source into an image beam by a light valve and projecting the image beam onto a projection screen or a wall through a lens thereby displaying images. With the progress of projection technology and the reduction of manufacturing cost, the application of projector gradually expands from the commercial use to the domestic use, and therefore, the miniature projector having relatively small size and light weight has gradually become the mainstream in the market.

Usually when a projector is use, the size of the projection screen and the distance of the projection screen to the projector may be limited by the environment. Therefore, the lens of the projector usually is disposed with an adjustment ring for adjusting the focal, thereby allowing users to adjust the image projected by the lens through the adjustment ring. A processor in the projector for controlling and driving the lens to move or rotate is required if the lens has an automatic or electrical focal adjustment; and the processor needs to sense and confirm the status of a focal adjustment through a feedback mechanism of a lens movement sensing system before driving the lens to perform the focal adjustment or during the process of the focal adjustment. Lens movement sensing systems can be divided into digital sensing and analog sensing. In the digital sensing, a sensor disposed on the lens is used to issue digital signals to the processor while passing through grating or magnetic grid, and the processor can determine the movement direction and the movement amount according to the number of the grating or magnetic grid has been passed through. In the analog sensing such as potential, resistive, capacitive or photoelectric types, a sensor is used to issue analog signals generated based on the change of voltage or current to the processor while moving, and the processor can determine the movement direction and the movement amount according to the analog signals.

However, the conventional processor has a relatively large size regardless digital sensing or analog sensing is adopted, and the relatively-large processor in size is not conducive to the installation in the miniature projector. Moreover, to work properly, the photoelectric or capacitive sensor must have a calibration each time when the projector is turned on and the installation of the processor inside the projector may lead to the light interference and electrostatic interference. Therefore, it is quite important for the persons in the art to solve the aforementioned problems.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a lens module capable of completing the determination of the focal automatic adjustment through the feedback mechanism thereof.

Another objective of the invention is to provide a projector capable of completing the determination of the focal automatic adjustment through the feedback mechanism thereof.

Other objectives and advantages of the invention can be further illustrated by the technical features broadly embodied and described as follows.

In order to achieve one or a portion of or all of the objects or other objects, the invention provides a lens module, which includes a lens, a first gravity sensor and a processor. The lens includes an optical axis and an adjustment assembly. The adjustment assembly rotates around the optical axis being as a rotation axis. The first gravity sensor is disposed on the adjustment assembly. The adjustment assembly drives the first gravity sensor to rotate. The first gravity sensor has a first axis, a second axis and a third axis perpendicular to each other. The first gravity sensor is configured to perform a detection at different time points. The first axis of the first gravity sensor is parallel to the optical axis of the lens. The first gravity sensor generates a first output at a first time point and a second output at a second time point. The processor is electrically connected to the adjustment assembly and the first gravity sensor. The processor receives the first output and the second output from the first gravity sensor. The processor calculates a first angle of the first gravity sensor relative to a water level according to the first output and calculates a second angle of the first gravity sensor relative to the water level according to the second output. The processor controls a focus adjustment of the lens according to the first angle and the second angle.

In order to achieve one or a portion of or all of the objects or other objects, the invention further provides a projector, which includes an illumination system, a light valve, a lens module and a processor. The illumination system is adapted to provide an illumination beam. The light valve is located on a transmission path of the illumination beam and adapted to covert the illumination beam into an image beam. The lens module is located on a transmission path of the image beam and adapted to convert the image beam into a projection beam. The lens module includes a lens and a first gravity sensor. The lens includes an optical axis and an adjustment assembly. The adjustment assembly rotates around the optical axis being as a rotation axis. The first gravity sensor is disposed on the adjustment assembly. The adjustment assembly drives the first gravity sensor to rotate. The first gravity sensor has a first axis, a second axis and a third axis perpendicular to each other. The first gravity sensor is configured to perform a detection at different time points. The first axis of the first gravity sensor is parallel to the optical axis of the lens. The first gravity sensor generates a first output at a first time point and a second output at a second time point. The processor is electrically connected to the adjustment assembly and the first gravity sensor. The processor receives the first output and the second output from the first gravity sensor. The processor calculates a first angle of the first gravity sensor relative to a water level according to the first output and calculates a second angle of the first gravity sensor relative to the water level according to the second output. The processor controls a focus adjustment of a focal of the lens according to the first angle and the second angle.

In summary, in the lens module of the embodiment of the invention, by adopting at least one gravity sensor to detect the rotation angle and the rotation direction of an adjustment assembly of a lens at different time points and output the rotation angle and the rotation direction of the adjustment assembly at different time points to a processor for computing, the processor can control the focus adjustment of the lens according to the calculated angles. The gravity sensor has small volume and light weight and therefore is suitable for a miniature projector. Further, the gravity sensor feeds back signal according to the magnetic induction and therefore is not affected by the light interference. In addition, the gravity sensor has high precision and digital-signal transmission and therefore has high anti-noise ability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
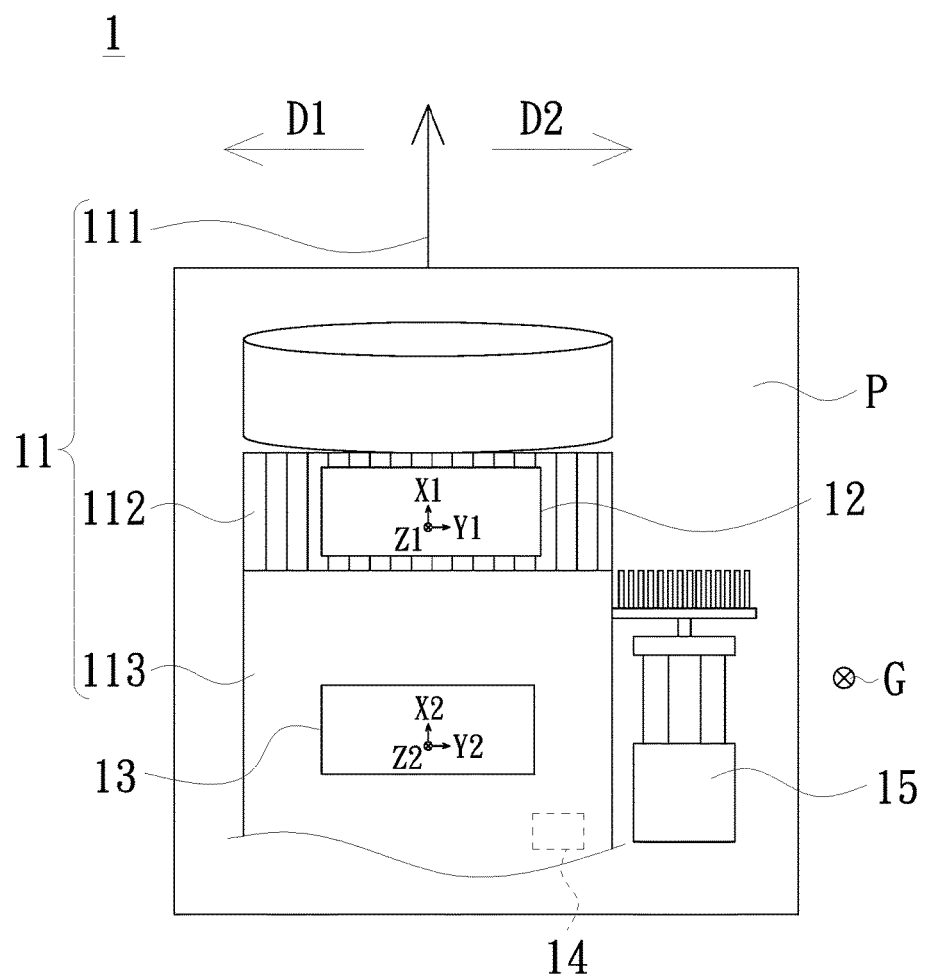
FIG. 1 is a schematic diagram of a lens module in accordance with an embodiment of the invention.
Figure 2:
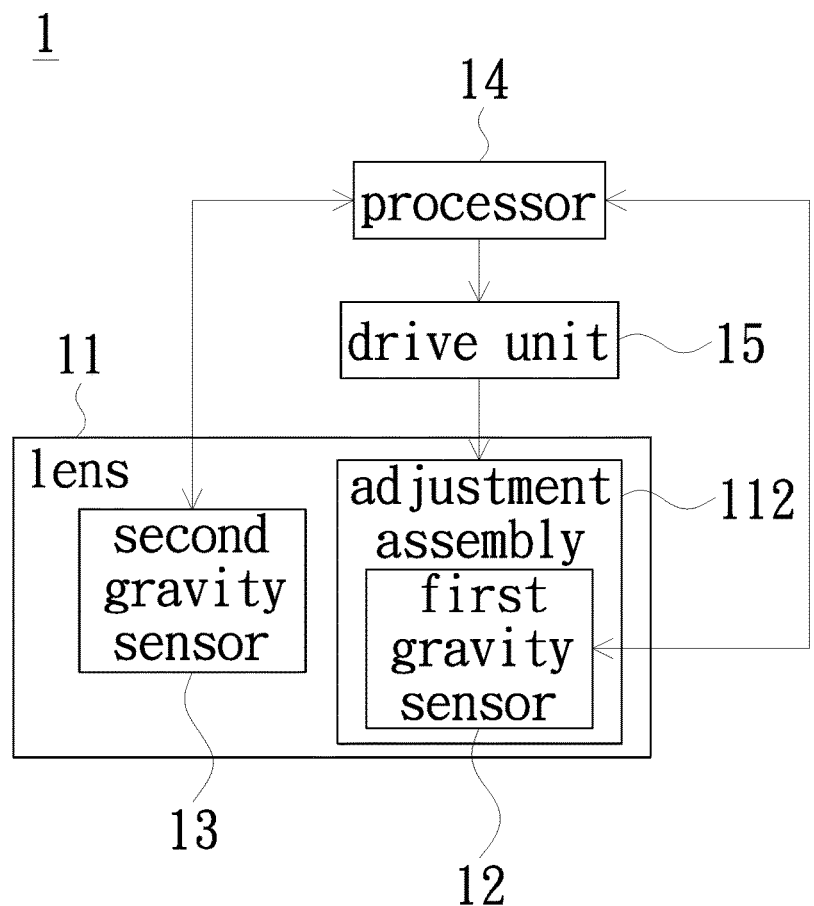
FIG. 2 is a functional block diagram of the lens module shown in FIG. 1.

FIG. 1 is a schematic diagram of a lens module in accordance with an embodiment of the invention. FIG. 2 is a functional block diagram of the lens module shown in FIG. 1. As shown in FIGS. 1 and 2, the lens module 1 of the embodiment includes a lens 11, a first gravity sensor 12, a second gravity sensor 13 and a processor 14. The lens 11 includes an optical axis 111, an adjustment assembly 112, a lens housing 113 extending along the optical axis 111 and a plurality of optical lens elements (not shown). The optical lens elements (not shown) are disposed in the lens housing 113 along the optical axis 111. The adjustment assembly 112 is disposed around the lens housing 113 and rotates around the optical axis 111 being as a rotation axis. In the embodiment, the adjustment assembly 112 is a focus adjustment ring for example, but the invention is not limited thereto. When the adjustment assembly 112 rotates around the optical axis 111 being as a rotation axis, a portion of the optical lens elements (not shown) in the lens housing 113 of the lens 11 is driven to move along the extending direction of the optical axis 111 and the other portion of the optical lens elements (not shown) is maintained at the original position on the optical axis 111 without moving along the extending direction of the optical axis 111. Therefore, through the rotation of the adjustment assembly 112, a portion of the optical lens elements is driven to move forward or backward relative to the other portion of the still optical lens elements along the extending direction of the optical axis 111, thereby changing the focal length of the lens 11 correspondingly. The first gravity sensor 12 is disposed on the adjustment assembly 112. The first gravity sensor 12 is driven to rotate by the adjustment assembly 112 when the adjustment assembly 112 rotates around the optical axis 111 being as a rotation axis. That is, the first gravity sensor 12 rotates with the adjustment assembly 112 synchronously; namely, the first gravity sensor 12 is disposed on a movable member of the lens module 1. The first gravity sensor 12 has a first axis X1, a second axis Y1 and a third axis Z1 which are perpendicular to each other; wherein the third axis Z1 is parallel to the gravity direction G for example. The first gravity sensor 12 is configured to perform a detection at different time points. Specifically, the first gravity sensor 12 senses the first-axis X1, the second-axis Y1 and the third-axis Z1 components of the gravitational acceleration at different time points. The second gravity sensor 13 is disposed in the lens housing 113; namely, the second gravity sensor 13 is disposed on a non-movable member of the lens module 1. The second gravity sensor 13 has a fourth axis X2, a fifth axis Y2 and a sixth axis Z2 which are perpendicular to each other; wherein the sixth axis Z2 is parallel to the gravity direction G for example. The second gravity sensor 13 is configured to perform a detection at different time points. Specifically, the second gravity sensor 13 senses the fourth-axis X2, the fifth-axis Y2 and the sixth-axis Z2 components of the gravitational acceleration at different time points. In the embodiment, the first axis X1 of the first gravity sensor 12 is, for example, parallel to the optical axis 111 of the lens 11 and the fourth axis X2 of the second gravity sensor 13 is, for example, parallel to the optical axis 111 of the lens 11. The processor 14 is electrically connected to the adjustment assembly 112, the first gravity sensor 12 and the second gravity sensor 13. The processor 14 is configured to control the rotation of the adjustment assembly 112 and determine a focus adjusting status of the lens 11 according to the change amounts of the rotation angle of the adjustment assembly 112 sensed by the first gravity sensor 12 and the second gravity sensor 13 respectively. The processor 14 can be a device such as a central processing unit (CPU), a digital signal processor (DSP), an application specific integrated circuit (ASIC) or a programmable logic gate array (FPGA) capable of executing the functions described in the invention.

It is to be noted that the configuration of the first axis X1 of the first gravity sensor 12 being parallel to the optical axis 111 of the lens 11 and the fourth axis X2 of the second gravity sensor 13 being parallel to the optical axis 111 of the lens 11 when the third axis Z1 of the first gravity sensor 12 and the sixth axis Z2 of the second gravity sensor 13 are parallel to the gravity direction G is only one of the embodiments of the invention, and the invention is not limited thereto. In other embodiments, the second axis Y1 of the first gravity sensor 12 is parallel to the optical axis 111 of the lens 11 and the fifth axis Y2 of the second gravity sensor 13 is parallel to the optical axis 111 of the lens 11 when the third axis Z1 of the first gravity sensor 12 and the sixth axis Z2 of the second gravity sensor 13 are parallel to the gravity direction G. Namely, at least one of the first axis X1, the second axis Y1 and the third axis Z1 of the first gravity sensor 12 is parallel to the optical axis 111 of the lens 11 and at least one of the fourth axis X2, the fifth axis Y2 and the sixth axis Z2 of the second gravity sensor 13 is parallel to the optical axis 111 of the lens 11.

As shown in FIGS. 1 and 2, the lens module 1 of the embodiment further includes a drive unit 15. The drive unit 15 is electrically connected between the processor 14 and the adjustment assembly 112 of the lens 11. The processor 14 controls the drive unit 15 to drive the adjustment assembly 112 to rotate. In the embodiment, the drive unit 15 is an actuating device such as an electric motor or a pneumatic motor capable of driving the adjustment assembly 112 to move and the drive unit 15 is, for example, disposed on the lens housing 113, but the invention is not limited thereto. In other embodiments, the drive unit 15 is disposed inside or outside of the lens housing 113 for example.

The mechanism of the focus automatic adjustment of the lens module 1 of the embodiment will be further described in detail as follow.

In the embodiment as shown in FIGS. 1 and 2, the first gravity sensor 12 senses the component of the gravitational acceleration in each axis (the first axis X1, the second axis Y1 and the third axis Z1) at a first time point and generates a first output accordingly; and synchronously the second gravity sensor 13 senses the component of the gravitational acceleration in each axis (the fourth axis X2, the fifth axis Y2 and the sixth axis Z2) at the first time point and generates a third output accordingly. The first output of the first gravity sensor 12 and the third output of the second gravity sensor 13 are transmitted to the processor 14. In the embodiment, the first time point represents the status of the adjustment assembly 112 having not rotated yet for example. Specifically, the first output generated by the first gravity sensor 12 at the first time point is the reading values of the first axis X1, the second axis Y1 and the third axis Z1. The above reading values are the component values of the gravitational acceleration in the first axis X1, the second axis Y1 and the third axis Z1. The component value of the gravitational acceleration in the first axis X1 does not change in the case when the first axis X1 of the first gravity sensor 12 is parallel to the optical axis 111 of the lens 11. Therefore, the reading value of the first axis X1 can be negligible when the processor 14 receives the first output from the first gravity sensor 12. The third output generated by the second gravity sensor 13 at the first time point is the reading values of the fourth axis X2, the fifth axis Y2 and the sixth axis Z2. The above reading values are the component values of the gravitational acceleration in the fourth axis X2, the fifth axis Y2 and the sixth axis Z2. The component value of the gravitational acceleration in the fourth axis X2 does not change in the case when the fourth axis X2 of the second gravity sensor 13 is parallel to the optical axis 111 of the lens 11. Therefore, the reading value of the fourth axis X2 can be negligible when the processor 14 receives the second output from the second gravity sensor 13. The processor 14 calculates a first angle of the first gravity sensor 12 relative to the water level P according to the first output, and calculates a third angle of the second gravity sensor 13 relative to the water level P according to the third output. In the embodiment, the water level P is a plane perpendicular to the gravity direction G for example. Specifically, the reading values of the second axis Y1 and the third axis Z1 from the first gravity sensor 12 are Ya1 and Za1 respectively and the first angle is obtained by putting Ya1 and Za1 into the equation: $\arctan(Ya1/Za1 \times 180/\pi)$. In the embodiment, the first angle is greater than or equal to −90 degrees and smaller than or equal to 90 degrees for example. Similarly, the reading values of the fifth axis Y2 and the sixth axis Z2 from the second gravity sensor 13 are Ya2 and Za2 respectively and the third angle is obtained by putting Ya2 and Za2 into the equation: $\arctan(Ya2/Za2 \times 180/\pi)$. In the embodiment, the third angle is greater than or equal to −90 degrees and smaller than or equal to 90 degrees for example. The processor 14 further calculates a first rotation angle according to the angle difference of the first angle and the third angle; wherein the first rotation angle represents the initial value of the adjustment assembly 112 having not rotated yet.

In the embodiment as shown in FIGS. 1 and 2, the first gravity sensor 12 senses the component of the gravitational acceleration in each axis (the first axis X1, the second axis Y1 and the third axis Z1) at a second time point and generates a second output accordingly; and synchronously the second gravity sensor 13 senses the component of the gravitational acceleration in each axis (the fourth axis X2, the fifth axis Y2 and the sixth axis Z2) at the second time point and generates a fourth output accordingly. The second output of the first gravity sensor 12 and the fourth output of the second gravity sensor 13 are transmitted to the processor 14. In the embodiment, the second time point represents the status of the adjustment assembly 112 having rotated for example. Specifically, the second output generated by the first gravity sensor 12 at the second time point is the reading values of the first axis X1, the second axis Y1 and the third axis Z1. The above reading values are the component values of the gravitational acceleration in the first axis X1, the second axis Y1 and the third axis Z1. The component values of the gravitational acceleration in the first axis X1 does not change in the case when the first axis X1 of the first gravity sensor 12 is parallel to the optical axis 111 of the lens 11. Therefore, the reading value of the first axis X1 can be negligible when the processor 14 receives the second output from the first gravity sensor 12. The fourth output generated by the second gravity sensor 13 at the second time point is the reading values of the fourth axis X2, the fifth axis Y2 and the sixth axis Z2. The above reading values are the component values of the gravitational acceleration in the fourth axis X2, the fifth axis Y2 and the sixth axis Z2. The component values of the gravitational acceleration in the fourth axis X2 does not change in the case when the fourth axis X2 of the second gravity sensor 13 is parallel to the optical axis 111 of the lens 11. Therefore, the reading value of the fourth axis X2 can be negligible when the processor 14 receives the fourth output from the second gravity sensor 13. The processor 14 calculates a second angle of the first gravity sensor 12 relative to the water level P according to the second output, and calculates a fourth angle of the second gravity sensor 13 relative to the water level P according to the fourth output. In the embodiment, the water level P is a plane perpendicular to the gravity direction G for example. Specifically, the reading values of the second axis Y1 and the third axis Z1 from the first gravity sensor 12 are Yb1 and Zb1 respectively and the second angle is obtained by putting Yb1 and Zb1 into the equation: $\arctan(Yb1/Zb1 \times 180/\pi)$. In the embodiment, the second angle is greater than or equal to −90 degrees and smaller than or equal to 90 degrees for example. Similarly, the reading values of the fifth axis Y2 and the sixth axis Z2 from the second gravity sensor 13 are Yb2 and Zb2 respectively and the fourth angle is obtained by putting Yb2 and Zb2 into the equation: $\arctan(Yb2/Zb2 \times 180/\pi)$. In the embodiment, the fourth angle is greater than or equal to −90 degrees and smaller than or equal to 90 degrees for example. The processor 14 further calculates a second rotation angle according to the angle difference of the second angle and the fourth angle; wherein the second rotation angle represents the angle of the adjustment assembly 112 having rotated. Finally, the processor 14 calculates an angle change according to the first rotation angle and the second rotation angle and is knowledge of the rotation angle and the rotation direction of the adjustment assembly 112 are obtained from calculation of the angle change. More specifically, the rotation angle of the adjustment assembly 112 is, for example, the angle from the position of the adjustment assembly 112 at the first time point to the position of the adjustment assembly 112 at the second time point; and the rotation direction of the adjustment assembly 112 is, for example, the direction from the position of the adjustment assembly 112 at the first time point to the position of the adjustment assembly 112 at the second time point. Accordingly, the movement distance and the movement direction of a portion of the optical lens elements in the lens 11 along the extending direction of the optical axis 111 at the second time point relative to that at the first time point are obtained. Consequently, the processor 14 determines the focus adjusting status of the lens 11 according to the rotation angle and the rotation direction of the adjustment assembly 112 and thereby controlling the focus adjustment of the lens 11 automatically and synchronously.

Further, in other embodiments, the first angle, the second angle, the third angle and the fourth angle in unit of radian are obtained by putting the first output, the second output, the third output and the fourth output into the formula: $\arctan(Y/Z)$ (wherein Y and Z are the reading values of the Y-axis and the Z-axis respectively) respectively. Compared with the embodiment, the angle calculated by the previous embodiment is in unit of degree.

It is to be noted that the processor 14 of the embodiment determines the rotation angle and the rotation direction of the adjustment assembly 112 according to the angle change calculated based on the first rotation angle and the second rotation angle. The aforementioned angle change is an angle difference of the first rotation angle and the second rotation angle for example; and accordingly, the processor 14 determines the rotation angle and the rotation direction of the adjustment assembly 112 according to the angle difference. For example, in one case, the processor 14 determines that the adjustment assembly 112 rotates 45 degrees in a second direction D2 opposite to the first direction D1 if the angle difference of the first angle and the second angle is 45 degrees. In another case, the processor 14 determines that the adjustment assembly 112 rotates 45 degrees in a first direction D1 if the angle difference of the first angle and the second angle is −45 degrees. The aforementioned first direction D1 is, for example, the counterclockwise direction of the adjustment assembly 112 by using the optical axis 11 as the rotation axis and the second direction D2 is, for example, the clockwise direction of the adjustment assembly 112 by using the optical axis 11 as the rotation axis. Further, in the embodiment, the first time point represents the status of the adjustment assembly 112 having not rotated yet for example; the second time point represents the status of the adjustment assembly 112 having been driven by the drive unit 15 controlled by the processor 14 to rotate for example; and the first gravity sensor 12 and the second gravity sensor 13 perform detection continuously at different time points during the process of the focus adjustment of the lens module 1. Therefore, the first time point may represent the status of the adjustment assembly 112 having rotated a period of time and the second time point may represent the status of the adjustment assembly 112 having further rotated another period of time from the status at the first time point. Thus, through the feedback mechanism generated by the continuous senses of the gravity sensors, the lens module can complete the determination of the focus automatic adjustment.

As shown in FIGS. 1 and 2, it is to be noted that the lens module 1 is disposed with the first gravity sensor 12 on the movable member (e.g., the adjustment assembly 112) and the second gravity sensor 13 on the non-movable member (e.g., the lens housing 113); the movable member of the lens module 1 can rotate relative to the non-movable member of the lens module 1, that is, the first gravity sensor 12 can rotate relative to the second gravity sensor 13; and the non-movable member can be the lens housing 113 of the lens module 1 or an assembled member (not shown) for fixing the lens 11. The aforementioned configuration is only one of the embodiments of the invention, and the invention is not limited thereto.

Figure 3:
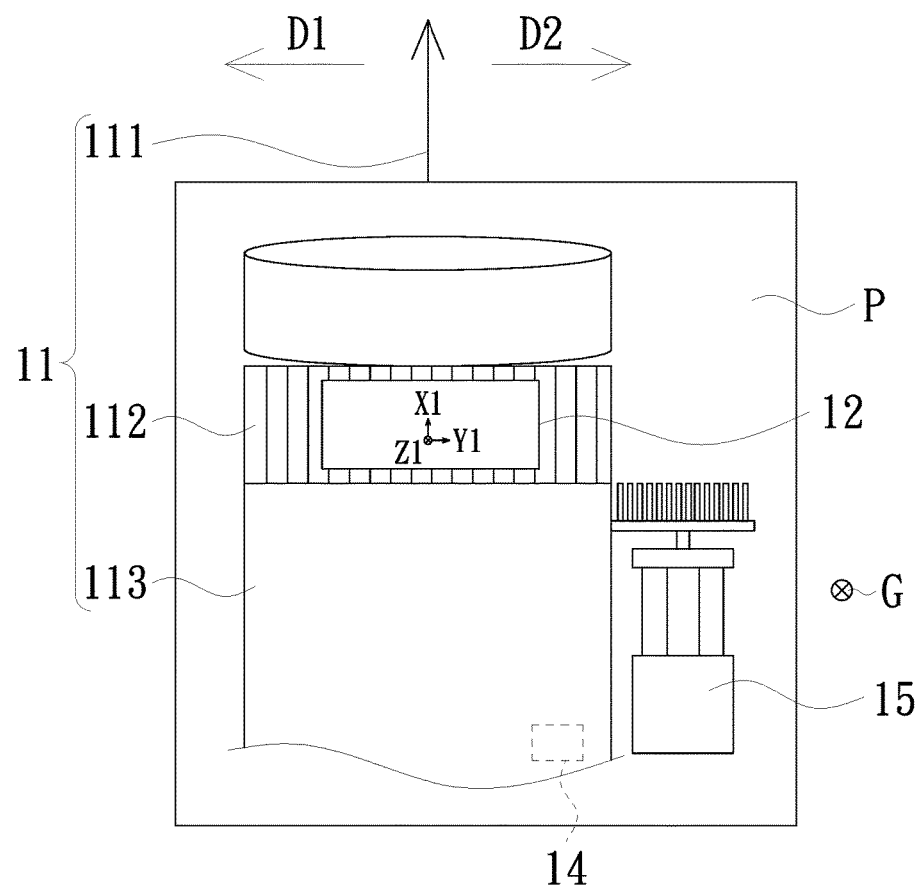
FIG. 3 is a schematic view of a lens module in accordance with another embodiment of the invention.

Referring to FIG. 3, which is a schematic view of a lens module 1a in accordance with another embodiment of the invention. The lens module 1a of the embodiment is similar to the lens module 1 shown in FIGS. 1 and 2. A difference lies in that the lens module 1a of the embodiment disposes only the first gravity sensor 12 on the adjustment assembly 112 without disposing the second gravity sensor on the non-movable member. Specifically, the first gravity sensor 12 senses the component of the gravitational acceleration in each axis (the first axis X1, the second axis Y1 and the third axis Z1) at different time points. In the case when the first axis X1 of the first gravity sensor 12 is parallel to the optical axis 111 of the lens 11, the first gravity sensor 12 generates the reading values of the first axis X1, the second axis Y1 and the third axis Z1 at the first time point (before the adjustment assembly 112 rotate) thereby forming the first output and generates the reading values of the first axis X1, the second axis Y1 and the third axis Z1 at the second time point (after the adjustment assembly 112 rotate) thereby forming the second output. The component of the gravitational acceleration in the first axis X1 does not change in the case when the first axis X1 of the first gravity sensor 12 is parallel to the optical axis 111 of the lens 11. Therefore, the reading value of the first axis X1 can be negligible when the processor 14 receives the first output and the second output from the first gravity sensor 12. After the processor 14 receives the first output and the second output from the first gravity sensor 12, the processor 14 calculates the first angle of the first gravity sensor 12 relative to the water level P according to the first output and calculates the second angle of the first gravity sensor 12 relative to the water level P according to the second output. The processor 14 further determines the rotation angle and the rotation direction of the adjustment assembly 112 according to the angle difference of the first angle and the second angle and thereby controlling the focus adjustment of the lens 11. In the embodiment of FIG. 3, more specifically, the lens module 1a will return to zero before performing the focus automatic adjustment. That is, the lens 11 is adjusted back to a reference position by the mechanical design or software design of the lens module 1a first and then the focal adjusting status of the lens 11 is determined by continuously using the rotation of the adjustment assembly 112.

Figure 4:
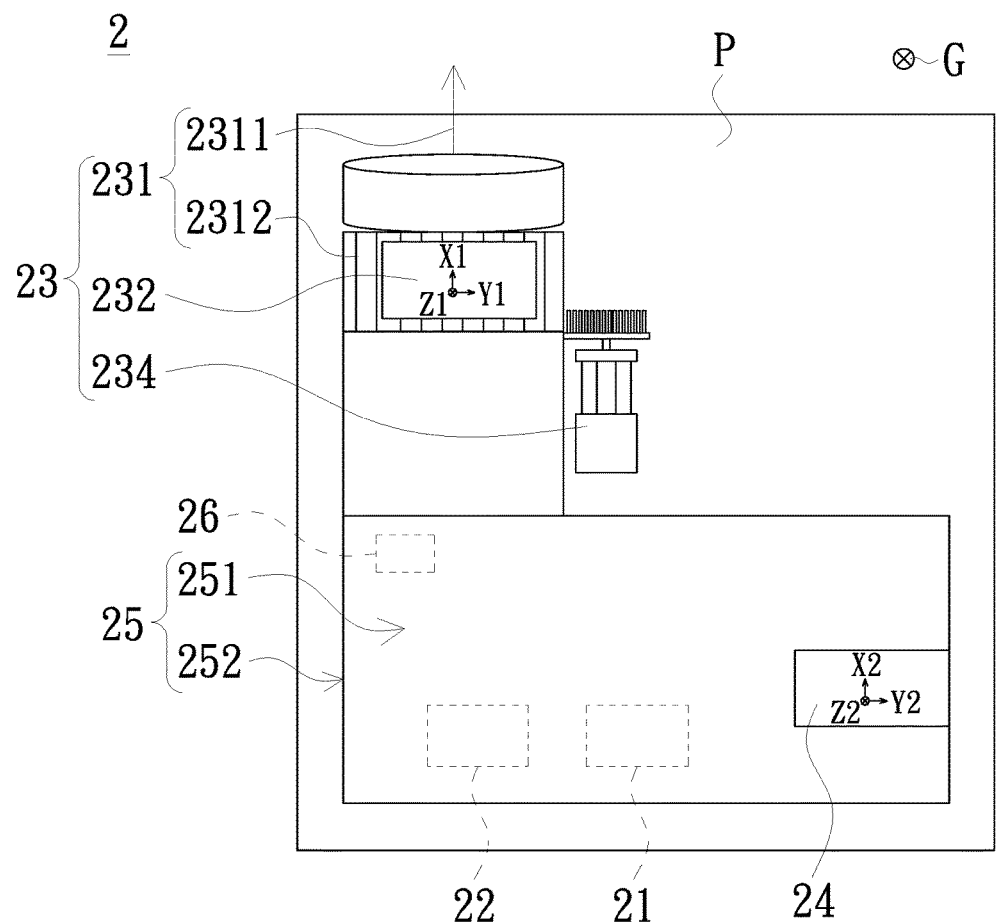
FIG. 4 is a schematic diagram of a projector in accordance with an embodiment of the invention.
Figure 5:
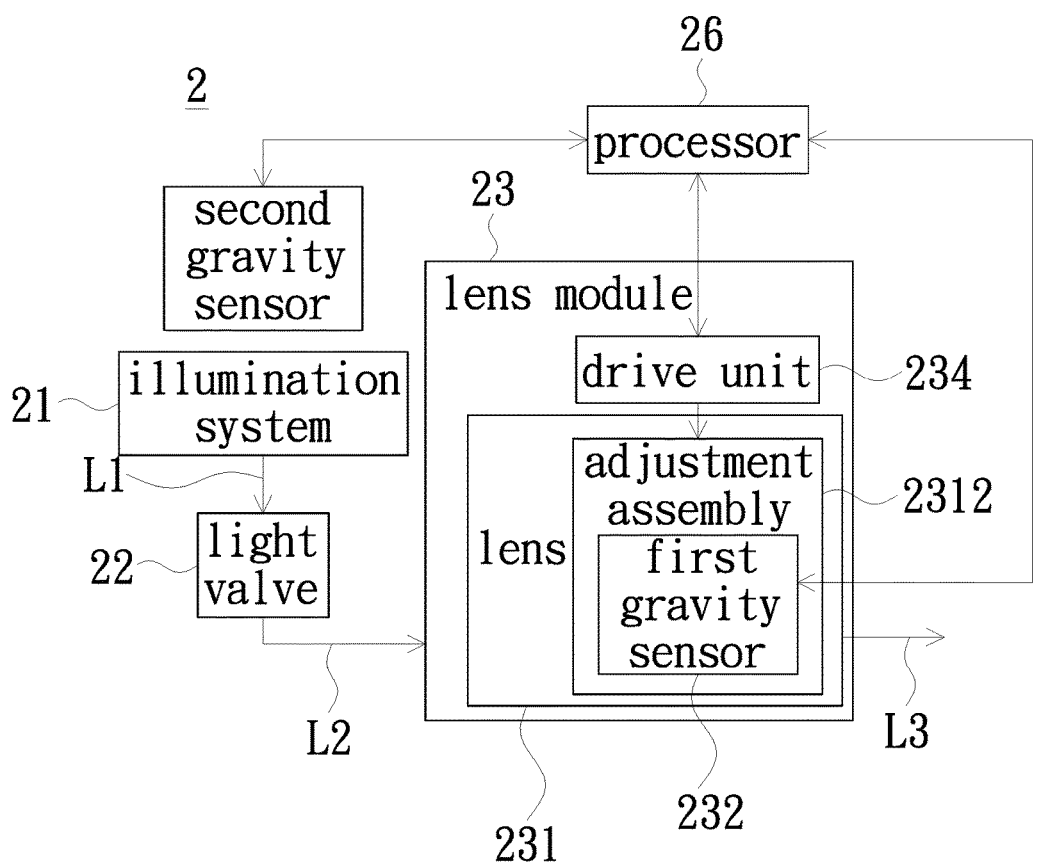
FIG. 5 is a functional block diagram of the projector shown in FIG. 4.

FIG. 4 is a schematic diagram of a projector in accordance with an embodiment of the invention. FIG. 5 is a functional block diagram of the projector shown in FIG. 4. As shown in FIGS. 4 and 5, the projector 2 of the embodiment includes an illumination system 21, a light valve 22, a lens module 23, a second gravity sensor 24 and a processor 26. The illumination system 21 is adapted to provide an illumination beam L1. The light valve 22 is located on a transmission path of the illumination beam L1 and adapted to covert the illumination beam L1 into an image beam L2. The lens module 23 is located on a transmission path of the image beam L2 and adapted to convert the image beam L2 into a projection beam L3. The lens module 23 includes a lens 231, a first gravity sensor 232 and a drive unit 234. The lens 231 includes an optical axis 2311, an adjustment assembly 2312 and a plurality of optical lens elements (not shown). The optical lens elements (not shown) are disposed along the optical axis 231. The adjustment assembly 2312 rotates around the optical axis 2311 being as a rotation axis. The first gravity sensor 232 is disposed on the adjustment assembly 2312 of the lens 231 and the first gravity sensor 232 rotates with the adjustment assembly 2312 synchronously. The drive unit 234 is electrically connected between the processor 26 and the adjustment assembly 2312. The processor 26 controls the drive unit 234 to drive the adjustment assembly 2312 to rotate. The processor 26 is electrically connected to the drive unit 234, the first gravity sensor 232 and the second gravity sensor 24. When the adjustment assembly 2312 rotates around the optical axis 2311 being as a rotation axis, a portion of the optical lens elements (not shown) in the lens 231 is driven to move along the extending direction of the optical axis 2311 and the other portion of the optical lens elements (not shown) is maintained at the original position on the optical axis 2311 without moving along the extending direction of the optical axis 2311. Therefore, through the rotation of the adjustment assembly 2312, a portion of the optical lens elements is driven to move forward or backward relative to the other portion of the still optical lens elements along the extending direction of the optical axis 2311, thereby changing the focal length of the lens 231 correspondingly. The processor 26 controls the focus adjustment of the lens 231 according to the rotation angles and the rotation directions of the adjustment assembly 2312 sensed by the first gravity sensor 232 and the second gravity sensor 24. The processor 26 may be disposed on the lens module 23 or other elements of the projector 2 as long as the condition of the processor 26 being electrically connected to the drive unit 234, the first gravity sensor 232 and the second gravity sensor 24 is satisfied; and the invention is not limited thereto.

It is to be noted that the structures and the functions of the first gravity sensor 232 and the second gravity sensor 24 in FIGS. 4 and 5 are similar to those of the first gravity sensor 12 and the second gravity sensor 13 in FIGS. 1 and 2, and no redundant detail is to be given herein. Further, the mechanism of how the projector 2 using the first gravity sensor 232 and the second gravity sensor 24 to automatically adjust the focal length of the lens 231 is similar to the mechanism of how the lens module 1 in FIGS. 1 and 2 automatically adjusting the focal length, and no redundant detail is to be given herein. More specifically, by disposing the first gravity sensor 232 on the adjustment assembly 2312 of the projector 2 and disposing the second gravity sensor 24 on the non-movable member of the projector 2, the rotation angle and the rotation direction of the adjustment assembly 2312 calculated by the processor 26 are not affected even the projector 2 is moved during the process of the focus adjustment; and consequently, the focal adjustment of the lens module 23 is not affected.

As shown in FIGS. 4 and 5, the projector 2 of the embodiment further includes a housing 25. Both of the illumination system 21 and the light valve 22 of the embodiment are disposed in the housing 25 and the second gravity sensor 24 is disposed on the housing 25. The housing 25 includes a first surface 251 and a second surface 252 perpendicular to each other. The first surface 251 is parallel to the optical axis 2311 of the lens 231 and the second surface 252 is perpendicular to the optical axis 2311 of the lens 231 for example. In the embodiment, the second gravity sensor 24 is disposed on the first surface 251 of the housing 25 for example, but the invention is not limited thereto. In other embodiments, the second gravity sensor 24 is disposed on the second surface 252 of the housing 25 for example. The second gravity sensor 24 may be disposed on other non-movable members of the projector 2 as long as the condition of at least one of the first axis X1, the second axis Y1 and the third axis Z1 of the first gravity sensor 232 being parallel to the optical axis 2311 of the lens 231 and at least one of the fourth axis X2, the fifth axis Y2 and the sixth axis Z2 of the second gravity sensor 24 being parallel to the optical axis 2311 of the lens 231 is satisfied.

In summary, in the lens module of the embodiment of the invention, by adopting at least one gravity sensor to detect the rotation angle and the rotation direction of an adjustment assembly of a lens at different time points and output the rotation angle and the rotation direction of the adjustment assembly at different time points to a processor for computing, the processor can control the focus adjustment of the lens according to the calculated angles. The gravity sensor has small volume and light weight and therefore is suitable for a mini-projector. Further, the gravity sensor feeds back signal according to the magnetic induction and therefore is not affected by the light interference. In addition, the gravity sensor has high precision and digital-signal transmission and therefore has high anti-noise ability.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A lens module, comprising:
   a lens comprising an optical axis and an adjustment assembly, wherein the adjustment assembly rotates around the optical axis being as a rotation axis;
   a first gravity sensor disposed on the adjustment assembly, wherein the adjustment assembly drives the first gravity sensor to rotate, the first gravity sensor has a first axis, a second axis and a third axis perpendicular to each other, the first gravity sensor is configured to perform a detection at different time points, the first axis of the first gravity sensor is parallel to the optical axis of the lens, and the first gravity sensor generates a first output at a first time point and a second output at a second time point;
   a processor electrically connected to the adjustment assembly and the first gravity sensor, wherein the processor receives the first output and the second output from the first gravity sensor, the processor calculates a first angle of the first gravity sensor relative to a water level according to the first output and calculates a second angle of the first gravity sensor relative to the water level according to the second output, and the processor controls a focus adjustment of the lens according to the first angle and the second angle; and
   a second gravity sensor, wherein the lens further comprises a lens housing extending along the optical axis, the adjustment assembly is disposed around the lens housing, and the second gravity sensor is disposed on the lens housing and electrically connected to the processor.

2. The lens module according to claim 1, wherein the processor determines a rotation angle and a rotation direction of the adjustment assembly according to an angle difference of the first angle and the second angle.

3. The lens module according to claim 1, wherein the second gravity sensor has a fourth axis, a fifth axis and a sixth axis perpendicular to each other, the second gravity sensor is configured to perform a detection at different time points, the fourth axis of the second gravity sensor is parallel to the optical axis of the lens, the second gravity sensor generates a third output at the first time point and a fourth output at the second time point, the processor receives the third output and the fourth output from the second gravity sensor, the processor calculate a third angle of the second gravity sensor relative to the water level according to the third output and calculates a fourth angle of the second gravity sensor relative to the water level according to the fourth output, the processor calculates a first rotation angle according to an angle difference between the first angle and the third angle, the processor calculates a second rotation angle according to an angle difference between the second angle and the fourth angle, and the processor controls the focus adjustment of the lens according to an angle change of the first rotation angle and the second rotation angle.

4. The lens module according to claim 3, wherein the processor determines that the adjustment assembly rotates in a first direction when the angle change is a positive value, and the processor determines that the adjustment assembly rotates in a second direction opposite to the first direction when the angle change is a negative value.

5. The lens module according to claim 1, wherein the first angle is greater than or equal to −90 degrees and smaller than or equal to 90 degrees, and the second angle is greater than or equal to −90 degrees and smaller than or equal to 90 degrees.

6. The lens module according to claim 1, further comprising a drive unit, wherein the drive unit is electrically connected between the processor and the adjustment assembly, and the processor controls the drive unit to drive the adjustment assembly to rotate.

7. A projector, comprising:
   an illumination system adapted to provide an illumination beam;
   a light valve located on a transmission path of the illumination beam and adapted to covert the illumination beam into an image beam;

a lens module located on a transmission path of the image
   beam and adapted to convert the image beam into a
   projection beam, the lens module comprising:
   a lens comprising an optical axis and an adjustment
      assembly, wherein the adjustment assembly rotates
      around the optical axis being as a rotation axis; and
   a first gravity sensor disposed on the adjustment assembly, wherein the adjustment assembly drives the first
      gravity sensor to rotate, the first gravity sensor has a
      first axis, a second axis and a third axis perpendicular
      to each other, the first gravity sensor is configured to
      perform a detection at different time points, the first
      axis of the first gravity sensor is parallel to the optical
      axis of the lens, and the first gravity sensor generates
      a first output at a first time point and a second output
      at a second time point;
a processor electrically connected to the adjustment
   assembly and the first gravity sensor, wherein the
   processor receives the first output and the second
   output from the first gravity sensor, the processor
   calculates a first angle of the first gravity sensor relative
   to a water level according to the first output and
   calculates a second angle of the first gravity sensor
   relative to the water level according to the second
   output, and the processor controls a focus adjustment of
   the lens according to the first angle and the second
   angle; and
a second gravity sensor and a housing, wherein the
   illumination system and the light valve are located in
   the housing, and the second gravity sensor is disposed
   on the housing and electrically connected to the processor.

8. The projector according to claim 7, wherein the processor determines a rotation angle and a rotation direction of the adjustment assembly according to an angle difference of the first angle and the second angle.

9. The projector according to claim 7, wherein the housing comprises a first surface and a second surface, the first surface is perpendicular to the second surface, and the second gravity sensor is disposed on the first surface or the second surface of the housing.

10. The projector according to claim 7, wherein the second gravity sensor has a fourth axis, a fifth axis and a sixth axis perpendicular to each other, the second gravity sensor is configured to perform a detection at different time points, the fourth axis of the second gravity sensor is parallel to the optical axis of the lens, the second gravity sensor generates a third output at the first time point and a fourth output at the second time point, the processor receives the third output and the fourth output from the second gravity sensor, the processor calculate a third angle of the second gravity sensor relative to the water level according to the third output and calculates a fourth angle of the second gravity sensor relative to the water level according to the fourth output, the processor calculates a first rotation angle according to an angle difference of the first angle and the third angle, the processor calculates a second rotation angle according to an angle difference of the second angle and the fourth angle, and the processor controls the focus adjustment of the lens according to an angle change of the first rotation angle and the second rotation angle.

11. The projector according to claim 10, wherein the processor determines that the adjustment assembly rotates in a first direction when the angle change is a positive value, and the processor determines that the adjustment assembly rotates in a second direction opposite to the first direction when the angle change is a negative value.

12. The projector according to claim 7, wherein the first angle is greater than or equal to −90 degrees and smaller than or equal to 90 degrees, and the second angle is greater than or equal to −90 degrees and smaller than or equal to 90 degrees.

13. The projector according to claim 7, wherein the lens module further comprises a drive unit, the drive unit is electrically connected between the processor and the adjustment assembly, and the processor controls the drive unit to drive the adjustment assembly to rotate.

14. A lens module, comprising:
   a lens comprising an optical axis and an adjustment
      assembly, wherein the adjustment assembly rotates
      around the optical axis being as a rotation axis;
   a first gravity sensor disposed on the adjustment assembly,
      wherein the adjustment assembly drives the first gravity
      sensor to rotate, the first gravity sensor has a first axis,
      a second axis and a third axis perpendicular to each
      other, the first gravity sensor is configured to perform
      a detection at different time points, the first axis of the
      first gravity sensor is parallel to the optical axis of the
      lens, and the first gravity sensor generates a first output
      at a first time point and a second output at a second time
      point; and
   a processor electrically connected to the adjustment
      assembly and the first gravity sensor, wherein the
      processor receives the first output and the second
      output from the first gravity sensor, the processor
      calculates a first angle of the first gravity sensor relative
      to a water level according to the first output and
      calculates a second angle of the first gravity sensor
      relative to the water level according to the second
      output, the processor controls a focus adjustment of the
      lens according to the first angle and the second angle,
      the processor determines that the adjustment assembly
      rotates in a first direction when the angle difference is
      a positive value, and the processor determines that the
      adjustment assembly rotates in a second direction
      opposite to the first direction when the angle difference
      is a negative value.

15. A projector, comprising:
   an illumination system adapted to provide an illumination
      beam;
   a light valve located on a transmission path of the illumination beam and adapted to covert the illumination
      beam into an image beam;
   a lens module located on a transmission path of the image
      beam and adapted to convert the image beam into a
      projection beam, the lens module comprising:
      a lens comprising an optical axis and an adjustment
         assembly, wherein the adjustment assembly rotates
         around the optical axis being as a rotation axis; and
      a first gravity sensor disposed on the adjustment assembly, wherein the adjustment assembly drives the first
         gravity sensor to rotate, the first gravity sensor has a
         first axis, a second axis and a third axis perpendicular
         to each other, the first gravity sensor is configured to
         perform a detection at different time points, the first
         axis of the first gravity sensor is parallel to the optical
         axis of the lens, and the first gravity sensor generates
         a first output at a first time point and a second output
         at a second time point; and
   a processor electrically connected to the adjustment
      assembly and the first gravity sensor, wherein the
      processor receives the first output and the second
      output from the first gravity sensor, the processor
      calculates a first angle of the first gravity sensor relative to a water level according to the first output and calculates a second angle of the first gravity sensor relative to the water level according to the second output, the processor controls a focus adjustment of the lens according to the first angle and the second angle, the processor determines that the adjustment assembly rotates in a first direction when the angle difference is a positive value, and the processor determines that the adjustment assembly rotates in a second direction opposite to the first direction when the angle difference is a negative value.

* * * * *